J. J. DIVEKEY.
SAFETY COMPRESSION BIB RELIEF.
APPLICATION FILED AUG. 13, 1909.
970,192.
Patented Sept. 13, 1910.
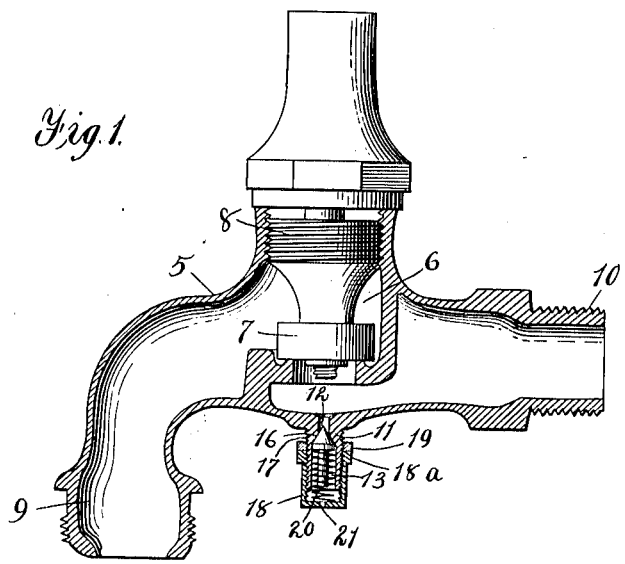
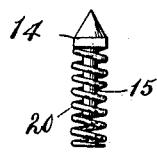
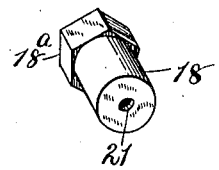
Witnesses:
C. F. Bassett
M. A. Milord
Inventor
John J. Divekey
By Frederick Benjamin
Atty.

UNITED STATES PATENT OFFICE.

JOHN J. DIVEKEY, OF AURORA, ILLINOIS.

SAFETY COMPRESSION BIB-RELIEF.

970,192.  Specification of Letters Patent.  Patented Sept. 13, 1910.

Application filed August 13, 1909.  Serial No. 512,657.

*To all whom it may concern:*

Be it known that I, JOHN J. DIVEKEY, citizen of the United States, residing at Aurora, in the county of Kane and State of Illinois, have invented certain new and useful Improvements in Safety Compression Bib-Reliefs, of which the following is a specification.

My invention relates to valves and has especial reference to devices of this class that are designed to be attached to the faucets of water heaters for the purpose of automatically relieving the water pressure whenever it rises above a predetermined point.

The main objects of the improvements which constitute the subject matter of this application for patent are:—to provide a simple device for the purpose stated; to supply a safety valve or vent that can be applied to the body of a faucet, and to so construct the device that it will be sure in its action, not likely to get out of order, and arranged in such a manner that it can be adjusted to correspond with variations required in the heating system to which it may be attached.

I accomplish the desired results by means of the devices illustrated in the accompanying drawing, which forms a part of this application, the details of construction being disclosed in the following views:—

Figure 1 is a median longitudinal section of an ordinary bib-cock having attached thereto my improved relief or safety valve; Fig. 2 is an enlarged view of the relief valve and spring, and Fig. 3 is a perspective view of the cap showing the outlet port, or vent.

Referring to the details of the drawing the numeral 5 indicates the body of the bib, 6 the valve chamber in which is located the usual main valve 7 with a threaded stem 8, the operating handle being removed. The bib or faucet has the usual nozzle 9, and a threaded end 10 for connection with a hot water pipe (not shown). Directly beneath the said valve the wall of the bib body is provided with a downwardly projecting cylindrical extension 11, which has a central bore 12 communicating with the cavity of said body, the lower portion of the said bore being enlarged to form a valve chamber 13, in which is located a conical relief valve 14, having a stem 15. The shoulder formed between the said chamber 13 and the bore 12 is made conical to correspond with the shape of the valve head 14, thus forming a seat 16 therefor. The external surface of said extension is provided with threads 17, and the end of the said extension is furnished with a cap 18, which is internally threaded to engage the said threads 17, a portion of the cap being squared to form a nut $18^a$ by means of which the cap may be readily applied or removed, and when properly adjusted the cap is prevented from turning by a lock nut 19 applied to the extension above the cap.

The vent or safety valve 14 is normally urged against its seat by a suitable coiled spring 20 which surrounds the stem 15, its upper end engaging the valve head and its lower end abutting against the end of said cap 18. This spring may be adjusted so as to cause the valve 14 to press more or less firmly against its seat by screwing the cap up or down to the extent required by means of a wrench applied to the nuts 18, 19.

The operation of this relief valve will be readily understood.

The pressure of the valve 14 against its seat having been properly regulated in the manner above described the device will need no further attention. It will be seen that whenever the main valve 7 is opened the pressure in the heater to which the bib is connected will be relieved, and the vent valve 14 will remain closed. It is only when said main valve is closed firmly upon its seat that the safety valve will be operated, and then only when the pressure behind the said main valve is sufficient to overcome the tension of the spring 20, and cause the said valve 14 to leave its seat. When this occurs the fluid under pressure will find an exit by way of the bore 12, a suitable vent 21 being provided in the end of the cap 18.

Having thus described my invention what I claim as new, is:—

1. In a bib, the combination with a hollow extension on the under side of the bib body communicating with the interior of the bib, a valve arranged in said extension, a spring normally urging said valve against its seat, and a perforated cap having threaded connection with the extension and engaging said spring.

2. A safety bib comprising an exteriorly threaded connection arranged on the under side of the bib body and having a passage therethrough, said passage communicating with the interior of the bib, a relief valve in said passage, a coiled spring surrounding the valve stem and tending to close the valve, an adjustable perforated cap engaging the threads on said extension and adapted to vary the tension of said spring when adjusted, and a lock nut on said extension adapted to engage said cap.

In testimony whereof I affix my signature in the presence of two witnesses.

JOHN J. DIVEKEY.

Witnesses:
 L. RACKMYER,
 ROBERT B. HORTON.